United States Patent [19]

Kupka

[11] 4,128,019
[45] Dec. 5, 1978

[54] STIRRING MECHANISM FOR A CLEARING VAT EMPLOYED IN BREWERIES

[76] Inventor: Dieter Kupka, Binger Landst. 37a, 6570 Kirn, Nahe, Germany

[21] Appl. No.: 790,894

[22] Filed: Apr. 26, 1977

[30] Foreign Application Priority Data

May 22, 1976 [DE] Fed. Rep. of Germany ... 7616495[U]

[51] Int. Cl.$^2$ .......................... F16H 27/02; F16H 1/18
[52] U.S. Cl. ................................. 74/424.8 R; 74/89.15
[58] Field of Search ................ 74/424.8 R, 89.15, 425

[56] References Cited

U.S. PATENT DOCUMENTS 3,002,400  10/1961  Scott .......................... 74/424.8 R X Primary Examiner—Leonard H. Gerin
Attorney, Agent, or Firm—McGlew and Tuttle

[57] ABSTRACT

A stirring mechanism for clearing vats which are used in breweries, comprises a movable frame with an electric drive motor and a worm gear drive driven by the motor which is mounted on the frame and drives a stirrer shaft depending downwardly from the movable frame. The movable frame is guided for upward and downward movement on a fixed support frame which has guide rods for this purpose. The construction also includes an intermediate member, such as an elevating screw, which is connected to the movable frame and is driven by an elevating mechanism mounted on a fixed frame.

10 Claims, 2 Drawing Figures

STIRRING MECHANISM FOR A CLEARING VAT EMPLOYED IN BREWERIES

FIELD AND BACKGROUND OF THE INVENTION

The present invention relates in general to stirring mechanisms and, in particular, to a new and useful stirring mechanism for clearing vats employed in breweries, which is electric motor driven through a worm gear and is designed to be mounted on or below a vat-type vessel, and which comprises a stirrer shaft centrally mounted in a gear housing and an elevating mechanism equipped with a separate power drive for vertically adjusting the stirring member to a level suitable for the filling and working operation.

DESCRIPTION OF THE PRIOR ART

Stirring mechanisms are usually attached to supporting beams which are placed on top of the clearing vat, or they are mounted below the vat, in which case, the stirrer shaft is passed tightly from below through a stuffing box provided in the bottom of the vat. The vats in breweries are filled with wet, ground, barley meal which is then leveled on the bottom of the vat by means of a stirring member secured to a stirrer shaft. Prior to pouring the meal into the vat, the stirring member is lifted, and after the filling, it is lowered again until it extends several centimeters into the wet meal. It is usual for the manufacturers of stirring mechanisms to instruct the operators that during the lifting and lowering operation, the stirrer shaft is to be stopped. However, in order to save time, the operators in breweries frequently allow the stirring members to slowly plunge into the meal while in rotary motion.

In the designs of the prior art, the worm gear, which is usually equipped with two electric motors, one for high speed and one for low speed, drives a centrally disposed hollow shaft surrounding an inner shaft which is guided therein and is connected to the stirrer shaft carrying the stirring member, and is vertically movable by a separately power-driven elevating mechanism. The taking along in rotation and the axial displaceability of the inner shaft is ensured by longitudinal grooves provided in the hollow shaft and guide pieces provided on the inner shaft.

The larger the size of such stirring mechanisms of the prior art, the more frequently difficulties have been experienced caused by a jamming of the guide pieces of the vertically adjustable inner shaft in the grooves of the hollow shaft during the lifting operation. This occurs even with a construction in which the stirrer shaft end at the vat bottom is supported in a special bearing block. Attempts have been made, in vain, to remedy these difficulties by complicated lubrication arrangements designed to prevent a seizing of the guide pieces in the grooves. To ensure ample lubrication entails a risk that the lubricant will pass into the vat and spoil the barley meal which is placed therein for brewing.

SUMMARY OF THE INVENTION

The present invention is directed to a stirring mechanism for clearing vats used in breweries, in which no inner shaft in a hollow shaft is provided. Thus, the lubricating problems which result from a guidance in grooves of the hollow shaft are absent, but otherwise, the well known design of drives and transmissions, as far as they have proven satisfactory, are maintained, if possible.

In accordance with the invention, a supporting frame is provided on which a gear designed as a drive unit is supported. The construction includes a housing, a stirrer shaft, and a stirring member, and the frame is guided for upward and downward motion on guide rods extending parallel to the geometric axis of the stirrer shaft. The upward and downward motion of the unit is effected through an intermediate member which acts on the supporting frame and is equipped with a separate power drive.

The hitherto usual prior art construction with a hollow shaft and the guidance in grooves and the necessary lubrication conduits, bores, and grease distributing grooves are omitted. Within the gear case, it is no longer necessary to use two sorts of lubricants, namely, oil for the worm gear, and grease for the key-groove guidance. The risk of the grease passing into the vat content is absent. There is no longer a relative motion during the vertical adjustment between the stirrer shaft, or the parts connected thereto, and the gear. A special support of the foot end of the stirrer shaft at the vat bottom is not necessary. The vertical motion is no longer adversely affected by any oscillations or deflections from the central position, or by unequally loaded stirring members. The upward and downward motion is now made possible even with the stirrer shaft rotating, without disadvantages for the lifting operation.

Accordingly, it is an object of the invention to provide a stirring mechanism for a clearing vat which is used in a brewery which comprises a movable frame with an electric drive motor and a worm gear drive driven by the motor mounted on the frame which drives a stirrer shaft which depends downwardly from the movable frame and, wherein, the movable frame is guided for upward and downward movement on a fixed support frame which has guide rods for this purpose and wherein the construction includes an intermediate member, such as an elevating screw, which is connected to the movable frame and which is driven by an elevating mechanism mounted on a fixed frame.

A further object of the invention is to provide a stirring mechanism for clearing vats of breweries which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
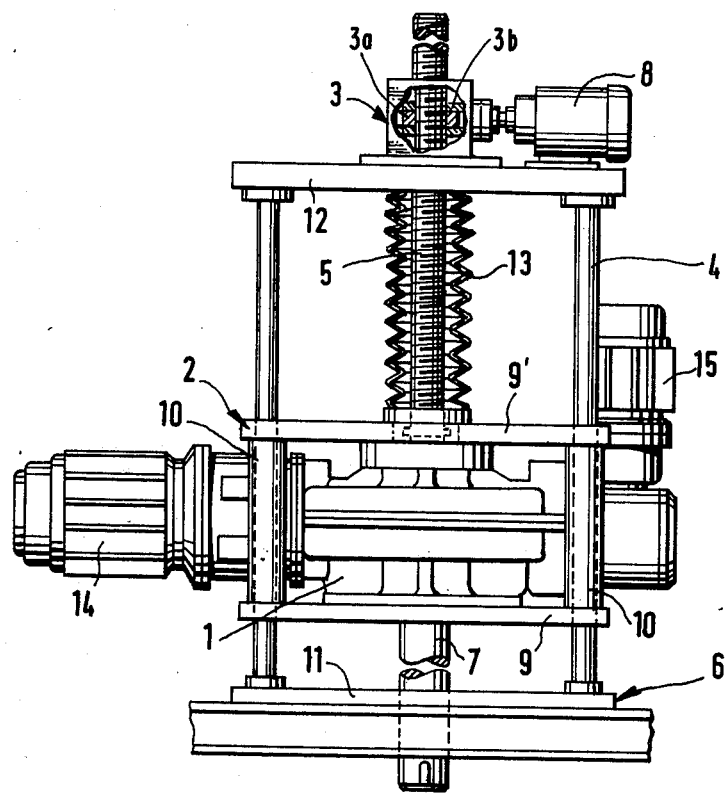
FIG. 1 is a side elevational view partly in section of one embodiment of the invention.

Referring to the drawing in particular, the embodiment of the invention shown therein, comprises a stirring gear 1, which is designed as a worm gear and is accommodated within a supporting frame 2. Supporting frame 2 comprises a lower and an upper triangular plate 9 and 9′. The two plates 9 and 9′ are connected to each other by guide sleeves 10 which slide on guide rods 4. Three guide rods 4 are symmetrically arranged about the geometric central axis which coincides with the axis of a stirrer shaft 7. Guide rods 4, along with a foot frame 11 and a head frame 12, form a rigid framework 6 of the stirring mechanism.

An elevating drive mechanism 3 is mounted on head frame 12 of framework 6 through which an intermediate member, such as an elevating screw 5, can be interscrewed up and down by means of a motor 8. Motor 8 turns worm gear 3b which in turn rotates gear 3a which is threaded over screw 5 and rotatably mounted on head frame 12. Screw 5 extends in the axial direction of stirrer shaft 7 and is mounted for rotation in upper plate 9 of supporting frame 2, but secured against axial displacement therein. Elevating screw 5 is surrounded by a protective envelope or bellows 13 which is capable of adapting in length to the vertical adjustment of the drive unit and which, in the present example, is designed as a bellows, but may also take the form of a telescoping sleeve or a flexible sleeve. In the embodiment shown, the elevating mechanism 3 is a worm gear.

In a modification of this embodiment, motor 8 which is flanged to head frame 12 in a horizontal position may be provided in a vertical position, and screw 5 may be driven by means of a V-belt. In any case, by driving the screw, its vertical position relative to framework 6 is varied. Thus, screw 5 travels in an axial direction and projects upwardly from the housing of elevating gear or drive mechanism 3. Screw 5 takes along supporting frame 2 with all the elements of the drive unit mounted thereon during this travel in the axial direction. Stirrer shaft 7 carries an extension (not shown) on its lower end, which is non-rotatably secured thereto and participates in the axial displacement, and on which the stirring member, which has not been shown, is mounted.

Figure 2:
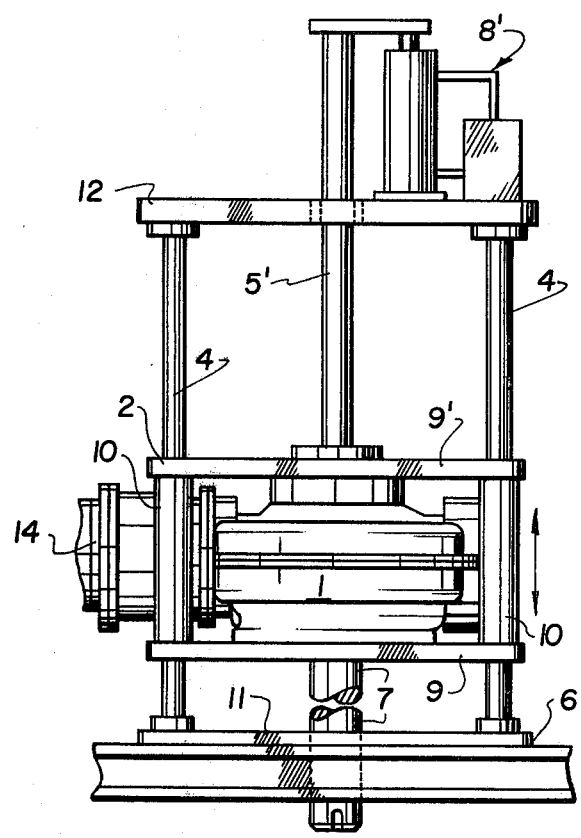
FIG. 2 is a view similar to FIG. 1 of another embodiment of the invention.

In the modification of FIG. 2, instead of elevating screw 5 and the elevating gear 3 associated therewith, which is driven by motor 8, a hydraulic elevating mechanism 8′ is provided, the screw 5 is replaced by a vertically movable tie rod 5′, the lower end of which is connected to upper plate 9 of supporting frame 2.

In the embodiment shown, as in the designs of the prior art, a large main drive motor 14 and a smaller motor 15 for creeping motion are provided to drive the worm gear 1. 14 and 15 are mounted on frame 2 and move with it. The end of the worm driven by motor 14 carries a small worm gear meshing with a worm driven by motor 15. A roller lock acting as a one-way clutch is provided between the two motor drives so that either of the motors 14, 15 may drive separately. In an advantageous development of the invention, the two motors 14 and 15 are disposed within the space defined by guide rods 4, in particular, on the housing of gear 1. Thereby, the mass of the downwardly and upwardly movable unit is concentrated around the central axis, which improves the smooth operation of the mechanism.

While a specific embodiment of the invention has been shown and described in detail to illustrate the application of the principles of the invention, it will be understood that the invention may be embodied otherwise without departing from such principles.

What is claimed is:

1. A stirring mechanism for clearing vats which are used in breweries, comprising a movable frame, an electric drive motor mounted on said movable frame, a worm gear drive connected to said electric drive motor for operation thereby and being mounted on said movable frame, a stirrer shaft connected to said worm gear and being rotatable thereby and depending from and rotatably supported on said movable frame, a fixed support frame having guide rod means for guiding said movable frame for upward and downward movement, an intermediate member secured to said movable frame and guided on said fixed support frame, and an elevating motor mounted on said fixed support frame and connected to said intermediate member to drive said intermediate member and said frame upwardly and downwardly.

2. A stirring mechanism, according to claim 1, wherein said intermediate member is an elevating screw having its lower end rotatably supported in said movable frame and an upper end guided on said fixed frame, said elevating screw being rotatable on said movable frame but being secured thereto against axial relative displacement in respect thereto.

3. A stirring mechanism, according to claim 2, wherein said elevating motor includes a rotatable shaft, an elevating drive gear connected to said rotating shaft and to said elevating screw and comprising a worm gear.

4. A stirring mechanism, according to claim 1, wherein said intermediate member comprises a rotating elevating screw extending between said fixed frame and said movable frame, and a protective envelope surrounding said screw extending from said fixed frame to said movable frame and being capable of adapting in length to the vertical spacing between said fixed frame and said movable frame.

5. A stirring mechanism, according to claim 1, wherein said intermediate member comprises a tie rod, said elevating motor comprising a hydraulic device connected to said tie rod.

6. A stirring mechanism, according to claim 1, wherein said fixed frame includes a substantially triangular upper and lower plate portion, and having a guide rod arranged in each corner of said triangular plate portion forming said guide rod means for guiding said movable frame, said guide rods being arranged symmetrically about the axis of said triangular plates.

7. A stirring mechanism, according to claim 6, wherein said movable frames include an upper triangular plate and a lower triangular plate with a guide sleeve extending between said upper and lower plates at each corner thereof, said sleeves having bores therethrough through which a respective guide rod extends.

8. A stirring mechanism, according to claim 1, wherein said fixed frame includes a foot member adapted to rest on the ground and a head frame member spaced vertically upwardly from said foot member, said guide rod means extending between said foot frame and said head frame to form a rigid framework which can be attached to the vat.

9. A stirring mechanism, according to claim 8, wherein said elevating motor is mounted on said frame member of said fixed frame.

10. A stirring mechanism, according to claim 1, wherein said movable frame comprises first and second vertically spaced plates having guide sleeves therebetween through which said guide rod means extend and including a second drive motor connected to said worm gear, said drive motor and said second drive motor being mounted on said frame between said plates.

* * * * *